Sept. 1, 1936.        J. R. BRADLEY        2,053,178
FOOD CHOPPER
Filed June 8, 1934

Inventor
Joseph R. Bradley
By Stanley Burch
Attorney

Patented Sept. 1, 1936

2,053,178

UNITED STATES PATENT OFFICE 2,053,178

FOOD CHOPPER

Joseph R. Bradley, Tulsa, Okla., assignor of one-half to Thomas B. Turner, Tulsa, Okla.

Application June 8, 1934, Serial No. 729,682

1 Claim. (Cl. 146—192)

This invention relates to portable hand-crank driven food choppers of the type wherein a clamp is provided for mounting the chopper on the edge of a table or the like, and wherein food inserted in a feed chamber is forced by means of a rotating feed screw through apertures in a cutting disk.

An important object of the present invention is to provide a food chopper of the above kind which is extremely simple and durable in construction and efficient in service, and wherein the body, clamp, feed screw, cutters, and actuating mechanism of the machine may be quickly taken apart for cleaning or any other desired purpose, as well as easily assembled, without the use of tools.

More particularly, the present invention contemplates the provision of an improved construction of food chopper of the above type wherein the parts are so disposed that the juices expressed from the food being chopped will not escape at any point other than the common discharge and directly into the vessel or receptacle arranged for reception of the chopped food, and wherein the feed hopper of the body is arranged so as to minimize danger of injury to the hands of persons placing food in the hopper and against the feed screw.

A still further object is to improve the general construction of food choppers of the above kind, and the invention consists in the novel form, combination and arrangement of parts hereinafter more fully described, shown in the accompanying drawing and claimed.

Figure 1:
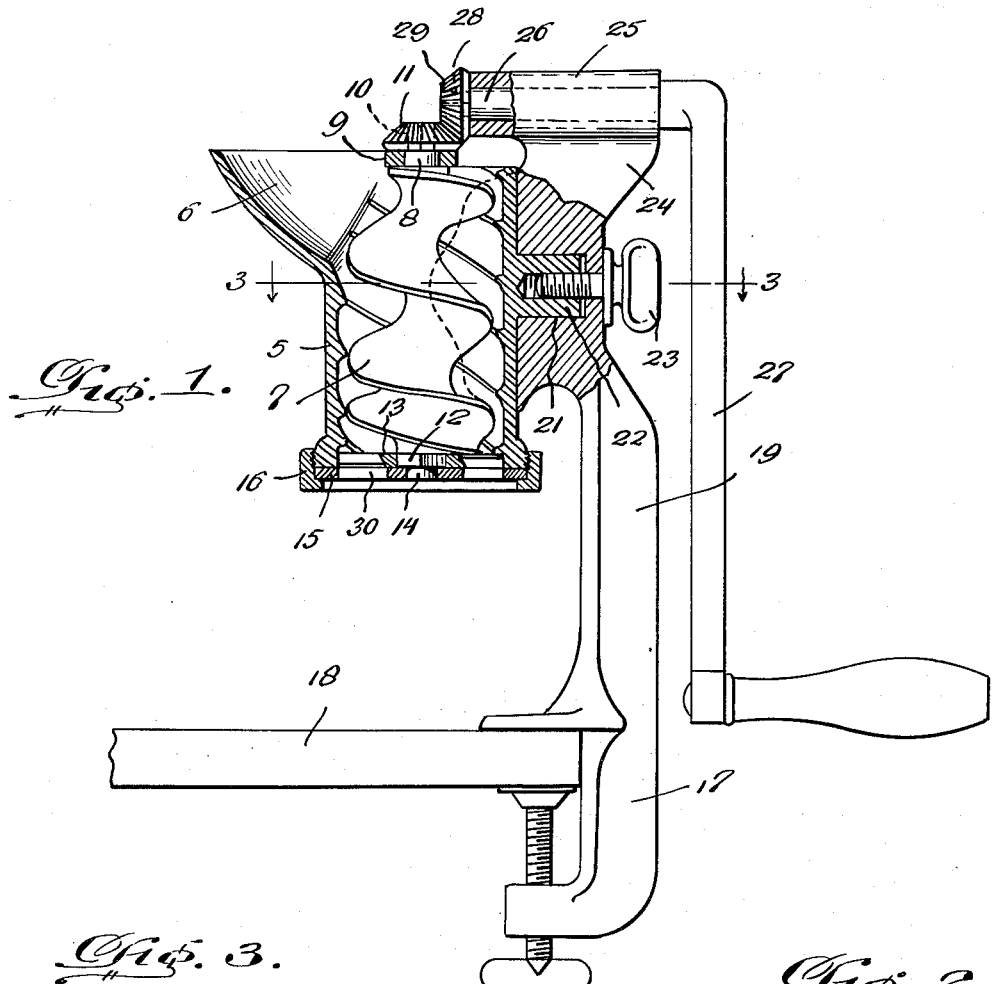
Figure 1 is a view, partly in elevation and partly in vertical section, of a food chopper constructed in accordance with the present invention.
Figures 2, 3:
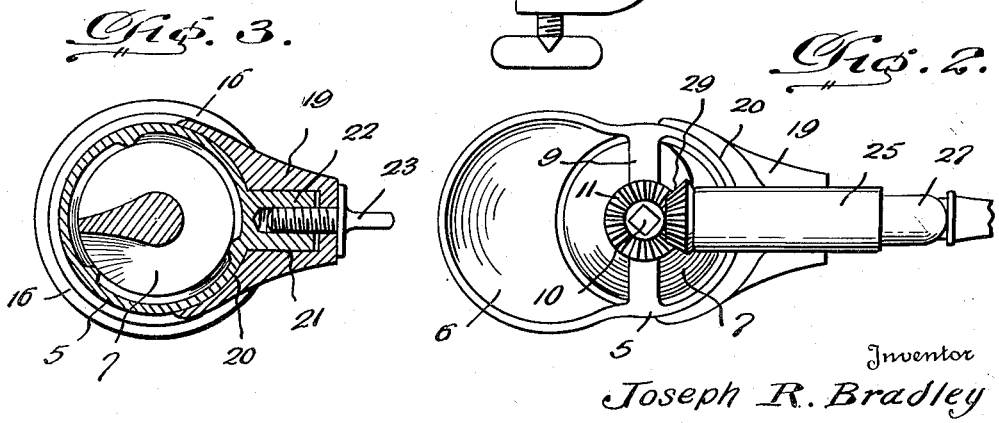
Figure 2 is a top plan view thereof partly broken away.
Figure 3 is a horizontal section on line 3—3 of Figure 1.

Referring more in detail to the drawing, the illustrated embodiment of the present invention includes a vertically arranged cylindrical body 5 whose upper end is laterally enlarged at one side to provide a feed hopper 6. Removably journaled in the body 5 is a feed screw 7 formed on its upper end with a stub shaft 8 removably journaled in the central opening of a cross bar 9 integral with and extending across the upper end of body 5. The stub shaft 8 has a projecting reduced squared terminal on which is removably fitted a beveled gear 11 forming part of the actuating mechanism for said screw 7 and a cutter carried by the lower end of the latter as will be presently described.

Formed on the lower end of feed screw 7 is a squared stub shaft 12 on which is fitted a rotatable cutter 13 arranged within the lower end of body 5. The stub shaft 12 has a reduced cylindrical terminal 14 journaled in the central opening of a stationary cutter disk 15 which is held in engagement with the under side of the cutter 13 and securely clamped at its margin against the lower end of body 5 by means of a clamping ring 16 removably threaded on the lower end of said body 5. It will thus be seen that when the clamping ring 16 is removed, the cutting disk 15 and cutter 13 may be taken off of the feed screw 7 and separated from the body 5 for cleaning or sharpening. Also, the feed screw 7 is then free to be removed downwardly out of the body 5 and detached from the gear 11 so that the body 5 and feed screw 7 may be readily cleaned.

The present food chopper further includes a clamp 17 to facilitate attachment of the machine to the edge of a table or like support as at 18. This clamp has a vertical upwardly extending arm or standard 19 the upper end of which is enlarged and formed so as to provide the same at one side with a vertical concavo-cylindrical recess 20 in which the body 5 is removably seated at one side. The upper end of standard 19 is further provided with a horizontal cylindrical socket 21 which communicates with recess 20 intermediate the top and bottom of the latter and snugly receives a hollow internally threaded stud 22 integrally formed on and projecting laterally from the adjacent side of body 5. A thumb screw 23 extends through the standard 19 and has threaded engagement within the stud 22 so as to removably secure the body 5 to the standard 19. The stud 22 thus sustains the weight of the body 5 and the parts carried thereby, the screw 23 preventing lateral separation of the body 5 and standard 19, and the seating of the body 5 in the recess 20 restraining the body 5 from rotation about a horizontal axis defined by the stud 22. Obviously, by removing screw 23, the body 5 may be readily separated from the clamp 17 and its standard 19 to facilitate cleaning of said body 5 without disturbing the engagement of the clamp with the table or other support 18. Formed on the upper end of standard 19 is an upward extension 24 terminating at its upper end in a horizontal bearing 25 in which is removably journaled the reduced cylindrical shaft portion 26 of a hand crank 27. The shaft portion 26 of crank 27 has a reduced squared terminal 28 on which is removably fitted a further beveled gear 29 which meshes with beveled gear 11. It will thus be seen that with the parts assembled as shown in Figure 1 rotation of shaft portion 26 of crank 27 will cause rotation of feed screw 7 through gears 29 and 11. Cutter 13 will naturally be revolved with feed screw 7, and any food deposited in hopper 7 will be readily engaged by screw 7 and fed downwardly through body 5 to cutter 13 and cutter disk 15. As the food is chopped or comminuted by the cutter 13 and cutter disk 15, it passes through the discharge openings 30 of the cutter disk 15 into a suitable receptacle placed on the table or support 18 directly beneath the lower end of body 5. Thus, any juices expressed from the food will be caused to escape directly into the food receiver placed beneath the body 5 and upon the table or support 18. It will further be particularly noted that the shaft portion 26 of crank 27 may be readily removed outwardly from bearing 25 because the gear 29 will readily slip off of the squared terminal 28 of the shaft portion 26 of crank 27. No securing means is necessary for the gears 11 and 29, and they will remain in proper position and relation as long as the crank portion 26 is held in the bearing 25 or not pulled outwardly of the latter. However, the use of readily removable fastening screws for gears 11 and 29 may be resorted to if found more desirable. It will be apparent that the construction provides for easy and safe feeding of food to and through the body 5, as well as delivery of all juices into the receiving vessel beneath the body 5.

From the foregoing description, it is believed that the construction and operation, as well as the advantages of the present invention, will be readily understood and appreciated by those skilled in the art. While I have illustrated and described what is at present believed to be the preferred construction of the present invention, it will be understood that minor changes may be made in the details of construction and form of parts without departing from the spirit and scope of the invention as claimed.

What I claim as new is:

A food chopper including a supporting standard, a vertical body removably secured to one side of said standard at the upper end of the latter, a feed screw removably journaled in said body, means operatively connected with the upper end of said feed screw for rotating the latter, said side of the upper end of said standard being formed with a vertical concavo-cylindrical recess in which one side of the body is fitted, said standard having a horizontal socket opening into said recess intermediate the top and bottom of the latter, the means for securing the body to the standard comprising a hollow internally threaded stud projecting from said side of the body and removably fitted in said socket, and a screw passing through the standard and removably threaded into said stud.

JOSEPH R. BRADLEY.